US012271143B2

(12) United States Patent
Nada et al.

(10) Patent No.: US 12,271,143 B2
(45) Date of Patent: Apr. 8, 2025

(54) IMAGE FORMING APPARATUS HAVING A FIXING UNIT WITH A CABLE CONNECTOR PROVIDED ON AN ATTACHMENT PORTION

(71) Applicant: CANON KABUSHIKI KAISHA, Tokyo (JP)

(72) Inventors: Takao Nada, Shizuoka (JP); Takayuki Mizuta, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/357,202

(22) Filed: Jul. 24, 2023

(65) Prior Publication Data

US 2024/0036512 A1 Feb. 1, 2024

(51) Int. Cl.
*G03G 15/00* (2006.01)
*G03G 15/20* (2006.01)
*G03G 21/16* (2006.01)

(52) U.S. Cl.
CPC ..... *G03G 21/1652* (2013.01); *G03G 15/2017* (2013.01); *G03G 21/1685* (2013.01)

(58) Field of Classification Search
CPC ........... G03G 15/2017; G03G 21/1652; G03G 21/1685
See application file for complete search history.

(56) References Cited

U.S. PATENT DOCUMENTS

| | | | |
|---|---|---|---|
| 9,291,984 B2 | 3/2016 | Moriya et al. |
| 9,423,757 B2 | 8/2016 | Mizuta et al. |
| 9,715,199 B2 | 7/2017 | Yoshida et al. |

FOREIGN PATENT DOCUMENTS

| | | |
|---|---|---|
| JP | 10339981 A | 12/1998 |
| JP | 2004251939 A | 9/2004 |
| JP | 2008203566 A | 9/2008 |
| JP | 2009258407 A | 11/2009 |
| JP | 2015087753 A | 5/2015 |
| JP | 2016031449 A | 3/2016 |

*Primary Examiner* — Hoang X Ngo
(74) *Attorney, Agent, or Firm* — Venable LLP

(57) ABSTRACT

An image forming apparatus includes: a fixing apparatus configured to fix onto a sheet-shaped recording medium a toner image formed on a surface of the recording medium, the fixing apparatus is detachable from an apparatus main body of the image forming apparatus, and the fixing apparatus includes: a fixing member configured to fix the toner image onto the recording medium; a case that houses the fixing member; a cable whose first end is connected to the fixing member; and a connector that is connected to a second end on a side opposite to the first end of the cable, and the connector is fixed to an outer wall surface of the case that faces in a direction opposite to an attaching direction in which the fixing apparatus is attached to the apparatus main body.

5 Claims, 9 Drawing Sheets

IMAGE FORMING APPARATUS HAVING A FIXING UNIT WITH A CABLE CONNECTOR PROVIDED ON AN ATTACHMENT PORTION

BACKGROUND OF THE INVENTION

Field of the Invention

The present invention relates to an image forming apparatus.

Description of the Related Art

Conventionally, some image forming apparatuses such as printers are configured such that fixing apparatuses are attachable to and detachable from apparatus main bodies to exchange and maintain the fixing apparatuses. Such a fixing apparatus includes connectors that electrically connect electrical parts in the fixing apparatus, and the apparatus main body. As a configuration of the connectors, a configuration including drawer connectors is proposed (see Japanese Patent Application Publication No. 2015-87753). According to such a configuration, a first connector provided to a fixing apparatus, and a second connector provided to an apparatus main body are connected by an operation of attaching the fixing apparatus.

Furthermore, as another configuration of connectors, a configuration that attaches a fixing apparatus to an apparatus main body, and then connects the connectors is proposed (see Japanese Patent Application Publication No. 2016-31449). Such a configuration includes a second connector that is provided at a distal end of a cable extending from an inner side of a side plate of the apparatus main body, and a first connector that is provided on an outer side of a longitudinal direction of a case that houses the fixing apparatus. Furthermore, in the middle of attaching the fixing apparatus to the apparatus main body, the second connector and the first connector are connected, and then attachment thereof to the apparatus main body is completed.

SUMMARY OF THE INVENTION

According to the example disclosed in Japanese Patent Application Publication No. 2015-87753, while attachment and detachment operability to and from the apparatus main body is good, the drawer connectors tend to be expensive and highly costly. Furthermore, the drawer connectors are provided at a downstream side in an attaching direction of the fixing apparatus, and have a low degree of freedom of arrangement. Furthermore, the drawer connectors are disposed on, for example, an outer side of a paper width direction or on a lower side of a paper transport path to avoid the paper transport path, which makes the apparatus larger.

According to the example disclosed in Japanese Patent Application Publication No. 2016-31449, the drawer connectors are not used, so that it is possible to suppress cost, while the connectors are disposed between the inner side of the side plate of the apparatus main body, and the fixing apparatus, and therefore a space is used in the paper width direction of the apparatus main body, which makes the apparatus larger. Furthermore, there is not an enough space between the inner side of the side plate and the fixing apparatus, and therefore it is not easy to perform an attaching operation to attach the fixing apparatus to the apparatus main body, and then connecting the second connector and the first connector. Therefore, the connectors are to be connected during the operation of attaching the fixing apparatus to the apparatus main body. The fixing apparatus is relatively heavy in many cases, the work of connecting the connectors while holding the fixing apparatus tends to be unstable, and is likely to lower operability of exchanging the fixing apparatus.

It is therefore an object of the present invention to provide an image forming apparatus that can attach and detach a fixing apparatus to and from an apparatus main body, and that suppresses cost from increasing and the apparatus from becoming larger, and has good operability of attaching and detaching the fixing apparatus.

The present invention is an image forming apparatus comprising:

a fixing apparatus configured to fix onto a sheet-shaped recording medium a toner image formed on a surface of the recording medium, the fixing apparatus being detachable from an apparatus main body of the image forming apparatus, wherein the fixing apparatus includes:

a fixing member configured to fix the toner image onto the recording medium;

a case that houses the fixing member;

a cable whose first end is connected to the fixing member; and a connector that is connected to a second end on a side opposite to the first end of the cable, wherein the connector is fixed to an outer wall surface of the case that faces in a direction opposite to an attaching direction in which the fixing apparatus is attached to the apparatus main body.

The present invention is an image forming apparatus comprising:

a fixing apparatus configured to fix onto a sheet-shaped recording medium a toner image formed on a surface of the recording medium, the fixing apparatus being detachable from an apparatus main body of the image forming apparatus, wherein the fixing apparatus includes:

a fixing member configured to fix the toner image onto the recording medium;

a case that houses the fixing member;

a cable whose first end is connected to the fixing member; and a connector that is connected to a second end on a side opposite to the first end of the cable, wherein the connector is fixed to an outer wall surface of the case that is configured to face an operator in a state where the fixing apparatus is attached to the apparatus main body, the operator performing an attaching operation to attach the fixing apparatus to the apparatus main body.

According to the present invention, it is possible to provide an image forming apparatus that can attach and detach a fixing apparatus to and from an apparatus main body, and that suppresses cost from increasing and the apparatus from becoming larger, and has good operability of attaching and detaching the fixing apparatus.

Further features of the present invention will become apparent from the following description of exemplary embodiments with reference to the attached drawings.

DESCRIPTION OF THE EMBODIMENTS

Embodiment 1

Hereinafter, an embodiment of the present invention will be exemplified with reference to the drawings. Note that dimensions, materials, and shapes of components, relative arrangement thereof, and the like described in the embodiment may be changed as appropriate depending on configurations and various conditions of apparatuses to which the present invention is applied, and do not intend to limit the range of the present invention to the following embodiment.

Configuration of Image Forming Apparatus

Figure 1:
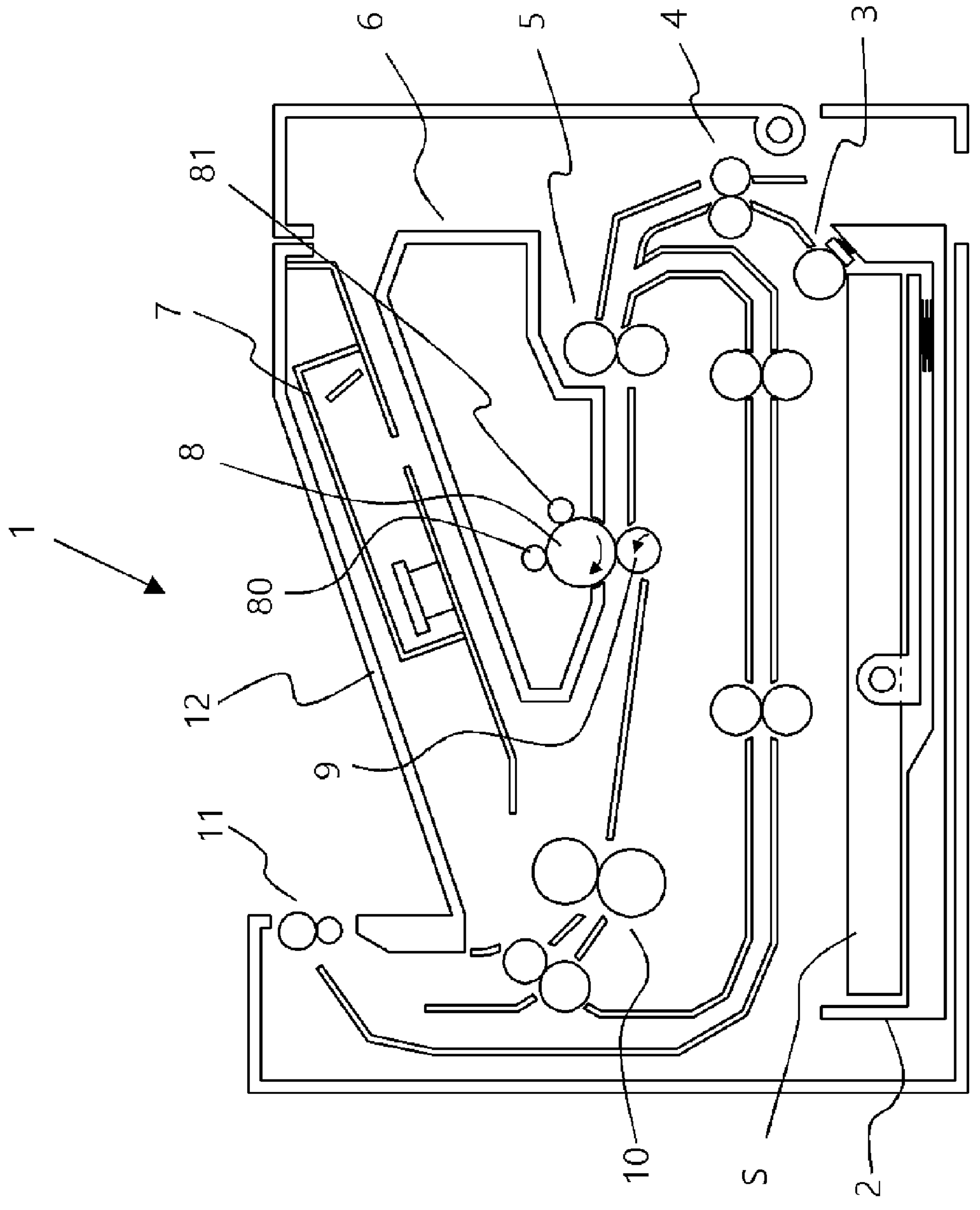
FIG. 1 is a cross-sectional view of an image forming apparatus according to embodiment 1.

FIG. 1 is a cross-sectional view illustrating a schematic configuration of the image forming apparatus according to embodiment 1. Note that FIG. 1 illustrates a laser beam printer as an example of the image forming apparatus.

An apparatus main body 1 of the image forming apparatus includes a drum-type electrophotographic photosensitive member (hereinafter, photosensitive drum 8) as an image bearing member. The photosensitive drum 8 is formed by providing a photosensitive material such as an Organic Photo Conductor (OPC), amorphous selenium, and amorphous silicon on a drum substrate of a cylinder shape formed of aluminum, nickel, or the like. The photosensitive drum 8 is rotatably supported by the apparatus main body 1, and is driven to rotate at a predetermined process speed by a drive source. A charging member 80, a developing member 81, and a transfer roller 9 that is a transfer member are disposed around the photosensitive drum 8 in order along a rotation direction of the photosensitive drum 8. Furthermore, a scanner unit 7 that is exposure means is disposed above the photosensitive drum 8. The photosensitive drum 8, the charging member 80, and the developing member 81 are configured as a process cartridge 6 that is attachable to or detachable from the apparatus main body.

The apparatus main body 1 includes a cassette 2 on which recording materials S such as paper are loaded, feeding means 3, a pair of conveyance rollers 4, a pair of resist rollers 5, a fixing apparatus 10, a pair of discharge rollers 11, and a discharge tray 12 in order along a transport route of the recording materials S as other components.

Operation of Image Forming Apparatus

Next, the operation of the apparatus main body 1 will be described. The photosensitive drum 8 driven and rotated by the drive source is uniformly charged to a predetermined polarity and a predetermined potential by the charging member 80. A surface of the charged photosensitive drum 8 is exposed on the basis of image information by the scanner unit 7, the charge of the exposed part is removed, and an electrostatic latent image (latent image) is formed. The electrostatic latent image is developed as a toner image by the developing member 81.

The toner image on the photosensitive drum 8 is transferred onto the recording material S by the transfer roller 9. The transfer roller 9 is biased by a biasing member (not illustrated) toward the photosensitive drum 8. According to this configuration, a transfer nip portion is formed between the transfer roller 9 and the photosensitive drum 8. Thus, the transfer roller 9 performs a transfer operation of causing the transfer nip portion to transfer onto the recording material S the toner image on the photosensitive drum 8 (on the image bearing member).

The recording material S is supplied from the cassette 2 in which the recording materials S are loaded and accommodated to the transport route of the recording materials S by the feeding means 3. The recording material S is transferred to the transfer nip portion via the pair of conveyance rollers 4 and the pair of resist rollers 5. The toner image transferred from the photosensitive drum 8 onto the recording material S by the transfer nip portion is heated and fixed by the fixing apparatus 10. The recording material S having passed the fixing apparatus 10 is discharged onto the discharge tray 12 via the pair of discharge rollers 11.

Outline of Fixing Apparatus

Figure 2:
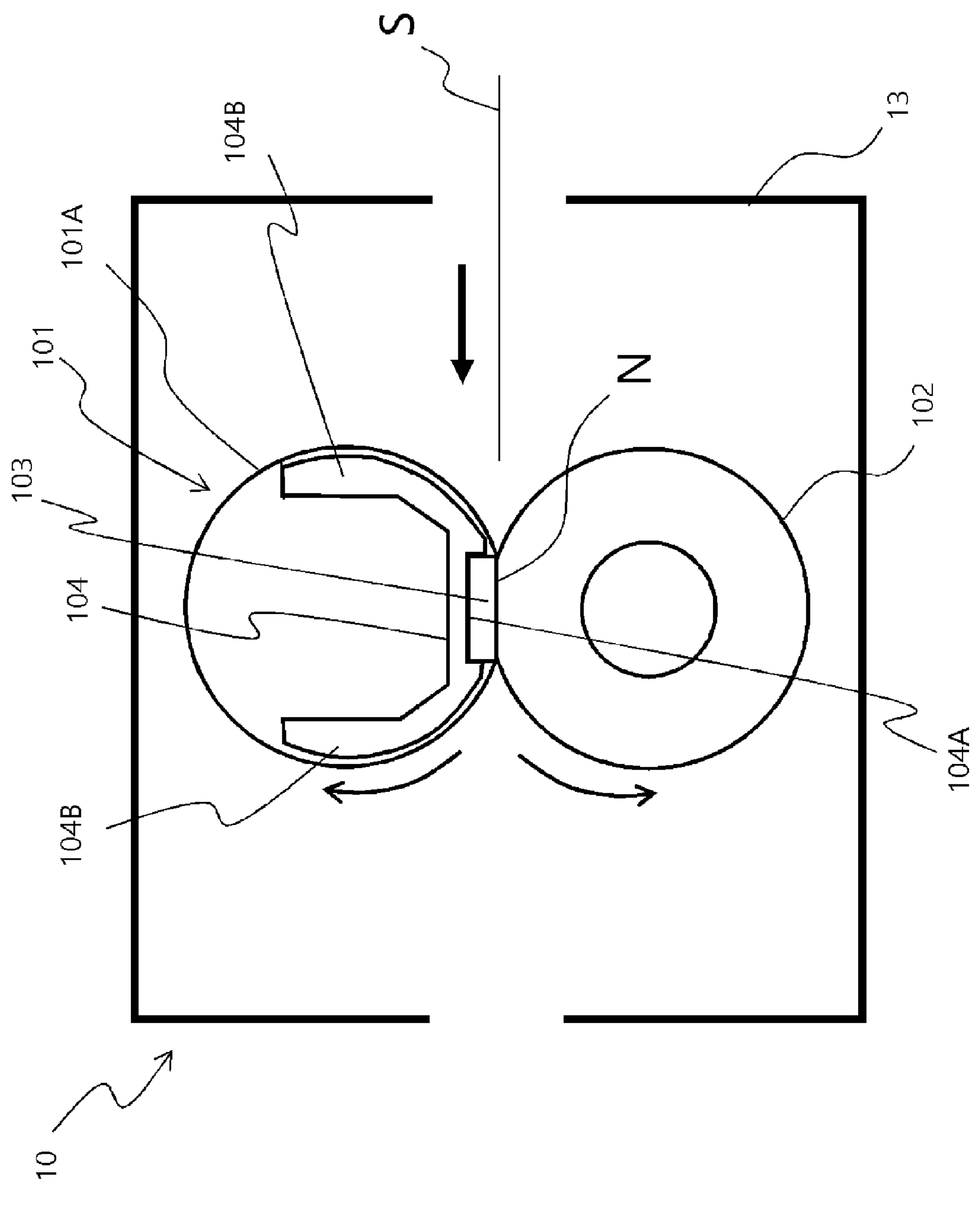
FIG. 2 is a schematic cross-sectional view of a fixing apparatus according to embodiment 1.
Figure 3:
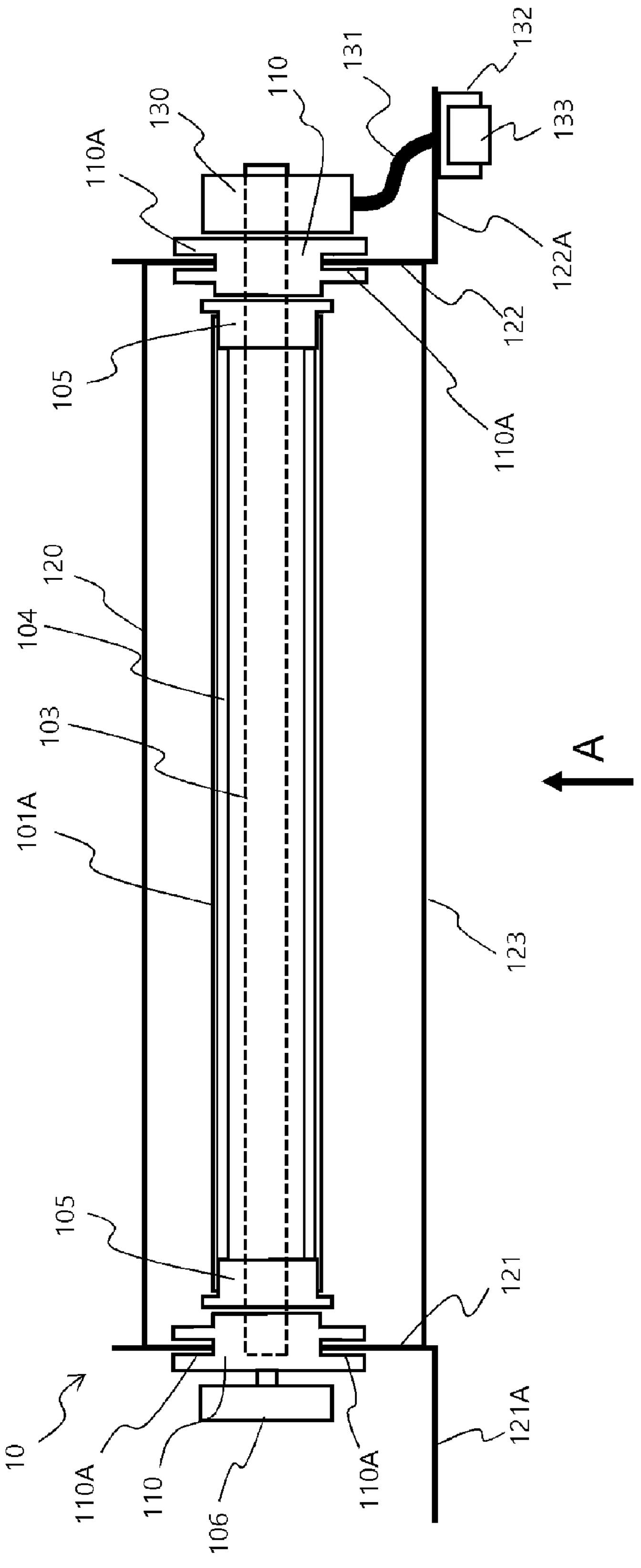
FIG. 3 is a schematic cross-sectional view of the fixing apparatus according to embodiment 1.

Next, a schematic configuration of the fixing apparatus 10 will be described with reference to FIGS. 2 and 3. FIG. 2 is a cross-sectional view of a cross section vertical to a longitudinal direction of the fixing apparatus 10 (an axial direction of a pressurizing roller 102). FIG. 3 is a cross-sectional view of a cross section including an axial line of a heating portion 101 of the fixing apparatus 10, and is a cross-sectional view seen from above the fixing apparatus 10.

The fixing apparatus 10 is an apparatus that fixes onto a sheet-shaped recording medium a toner image formed on a surface of the recording medium. As illustrated in FIG. 2, the fixing apparatus 10 includes the heating portion 101 and the pressurizing roller 102 that are fixing members that fix toner images onto recording medium, and a case 13 that houses these fixing members. The heating portion 101 includes a fixing film 101A, a heater 103 that is a heat source, and a heater holder 104. The fixing film 101A has an endless belt shape, and includes the heater 103, the heater holder 104, and a flange 105 disposed inside. The heater 103 is held by a holding portion 104A of the heater holder 104, and is disposed at a position facing the pressurizing roller 102. Furthermore, the heater 103 is configured to come into contact with the inner circumferential surface of the fixing film 101A to form a nip N between the pressurizing roller 102 and the heater 103 via the fixing film 101A. The fixing film 101A is held in a substantially cylindrical shape by a guide portion 104B of the heater holder 104, and the flange 105 fitted to both ends of the fixing film 101A.

As illustrated in FIG. 3, the case 13 includes a front wall surface 120, a rear wall surface 123, a first fixing side plate 121, and a second fixing side plate 122. The front wall surface 120 couples the first fixing side plate 121 and the second fixing side plate 122 on a downstream side of an attaching direction A of the fixing apparatus 10. The rear wall surface 123 couples the first fixing side plate 121 and the second fixing side plate 122 on an upstream side in the attaching direction A of the fixing apparatus 10. As described above, the fixing apparatus 10 employs the configuration where the case 13 of a substantially cuboid shape houses the fixing members such as the heating portion 101 and the pressurizing roller 102.

A flange base 110 includes a groove 110A formed therein, fits to a flange base guide portion 109 (see FIGS. 6 and 7) formed in the first fixing side plate 121 and the second fixing side plate 122, and is held movably in an upper/lower direction in FIG. 2. The position in a paper transport direction of the flange 105 is positioned with respect to the flange base 110, and is configured to be movable along the flange base guide portion 109 together with the flange base 110. Consequently, the heating portion 101 including the fixing film 101A is movable in the upper/lower direction in FIG. 2. Furthermore, the heater holder 104 is pressurized against the pressurizing roller 102 by an unillustrated pressurizing mechanism.

A drive input portion 106 is disposed at one end of the pressurizing roller 102, and, when a drive force from the apparatus main body is input to the drive input portion 106, the pressurizing roller 102 is driven to rotate. The fixing film 101A is pressed against the pressurizing roller 102 by the nip N. Hence, when the pressurizing roller 102 is driven to rotate, the fixing film 101A is also driven to rotate along the heater holder 104 and the flange 105.

An opposite side to the drive input portion 106 of the pressurizing roller 102 among the ends of the heater 103 protrudes from the flange base 110. Furthermore, a heater connector 130 is configured to be connected to the heater 103. Electric power is fed to the heater 103 via this heater connector 130.

As described above, when the recording material S is transported to the nip N, the recording material S is heated and pressurized while being nipped and transported by the fixing film 101A and the pressurizing roller 102, and a toner image is fixed thereon.

Installation of Fixing Apparatus to Apparatus Main Body

Figure 4:
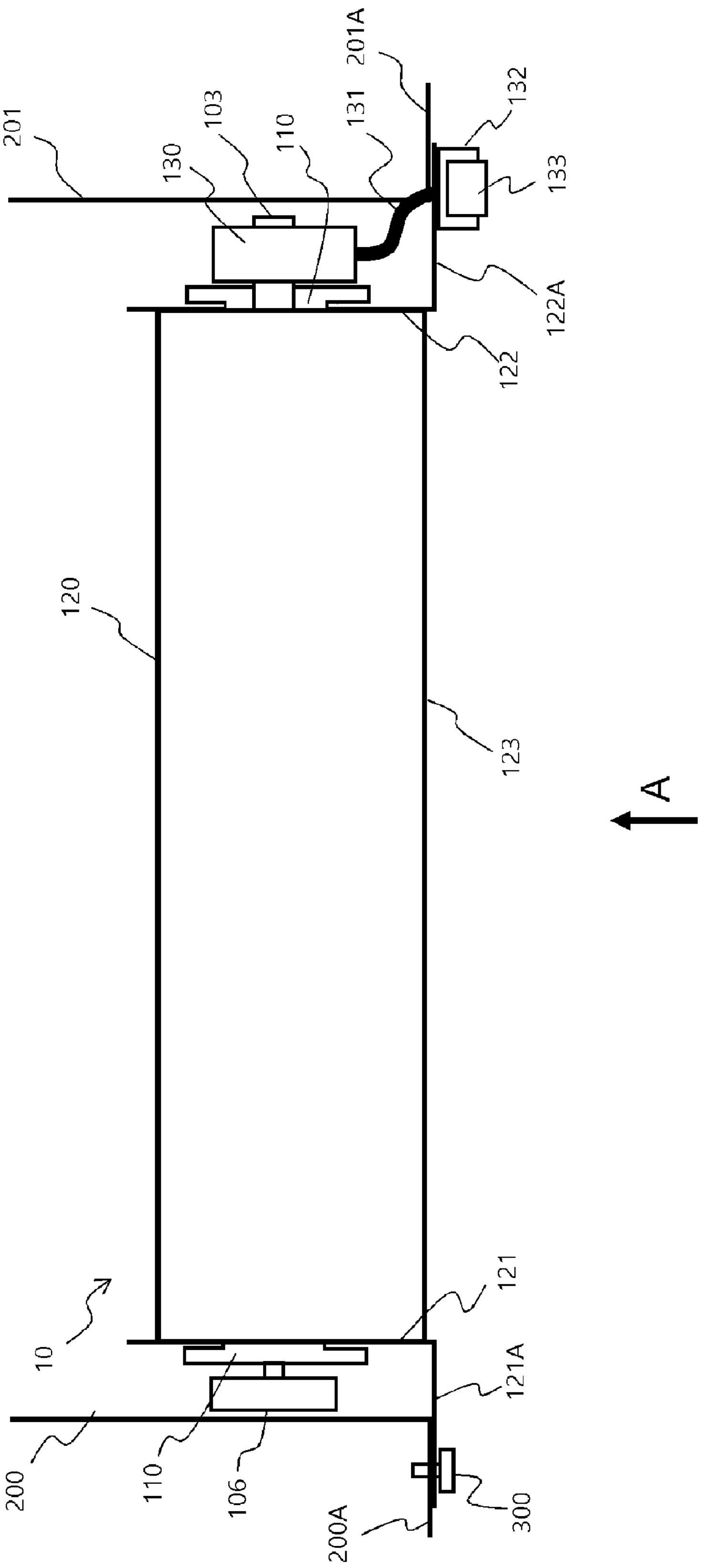
FIG. 4 is a schematic top view of a state where the fixing apparatus is attached to the image forming apparatus according to embodiment 1.
Figure 5:
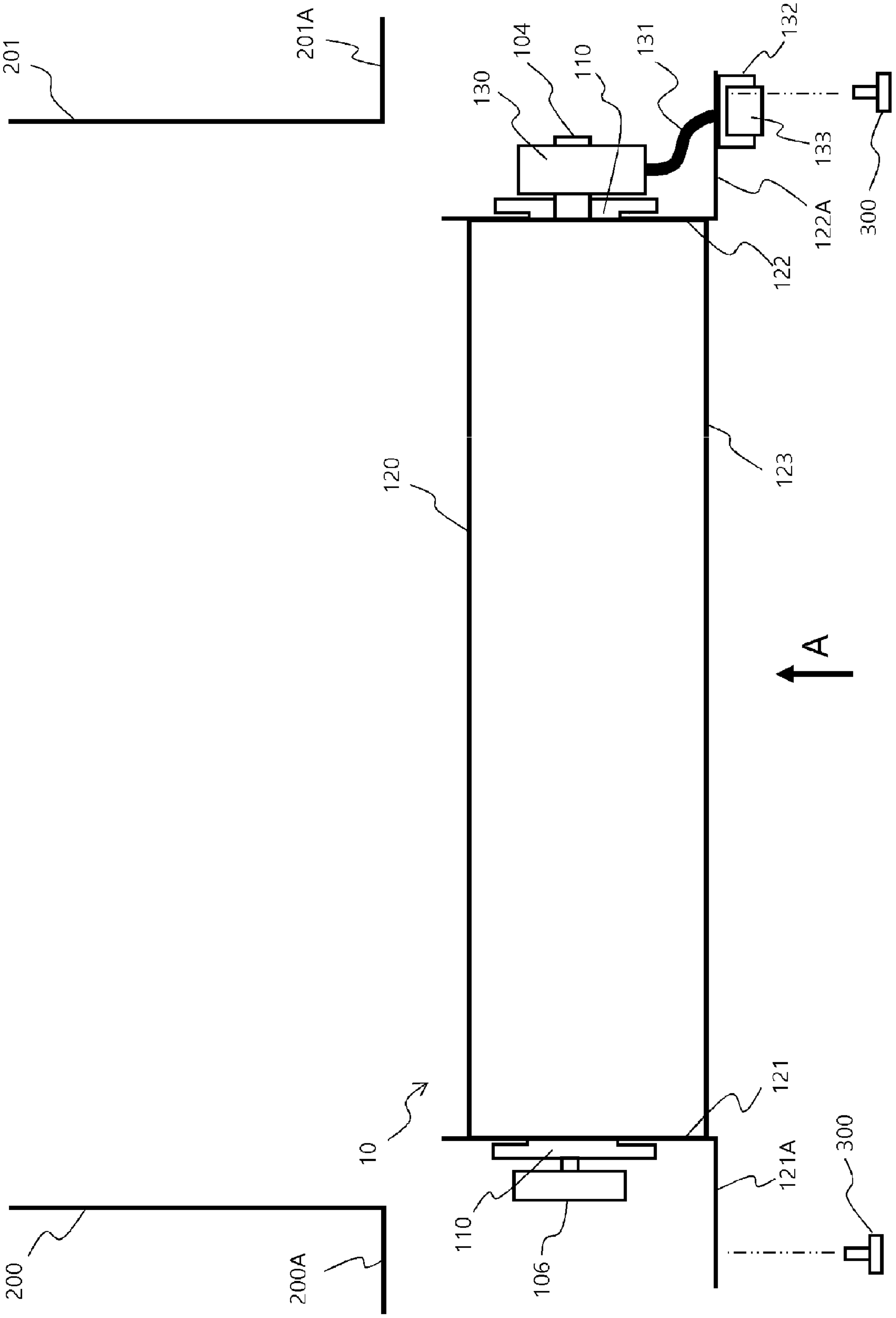
FIG. 5 is a schematic top view of a state where the fixing apparatus is not attached to the image forming apparatus according to embodiment 1.

Next, a state where the fixing apparatus 10 is installed to the apparatus main body 1 will be described with reference to FIGS. 4 and 5. FIG. 4 is a view illustrating from above the state where the fixing apparatus 10 is attached to the apparatus main body 1. FIG. 5 is a view illustrating from above the state where the fixing apparatus 10 is detached from the apparatus main body 1 or a state where the fixing apparatus 10 is about to be attached to the apparatus main body 1.

The fixing apparatus 10 according to embodiment 1 is detachably mounted on the apparatus main body 1 of the image forming apparatus. As illustrated in FIG. 4, a first attachment portion 121A is formed on the first fixing side plate 121 extending in a direction (a left direction seen from the attaching direction A) apart from the fixing apparatus 10 in the paper width direction. Furthermore, a second attachment portion 122A is formed on the second fixing side plate 122 extending in a direction (a right direction seen from the attaching direction A) apart from the fixing apparatus 10 in the paper width direction. In this way, the first attachment portion 121A and the second attachment portion 122A are provided on the left and right sides in the paper width direction of the fixing apparatus 10. The first attachment portion 121A and the second attachment portion 122A include the faces vertical to the attaching direction A.

The apparatus main body 1 includes a first side plate 200 and a second side plate 201, and the fixing apparatus 10 is inserted in a space between the first side plate 200 and the second side plate 201 in the paper width direction. The first side plate 200 includes a first attachment target portion 200A that has a face vertical to the attaching direction A, and the second side plate 201 includes a second attachment target portion 201A that has a face vertical to the attaching direction A.

When the fixing apparatus 10 is attached to the apparatus main body 1, the first attachment portion 121A of the fixing apparatus 10 is positioned with respect to the first attachment target portion 200A of the first side plate 200 of the apparatus main body 1. Furthermore, the second attachment portion 122A of the fixing apparatus 10 is positioned with respect to the second attachment target portion 201A of the second side plate 201 of the apparatus main body 1. Furthermore, screws 300 are used to fix the first attachment portion 121A and the first attachment target portion 200A, and fix the second attachment portion 122A and the second attachment target portion 201A to attach the fixing apparatus 10 to the apparatus main body 1. When the fixing apparatus 10 is detached from the apparatus main body 1, the screws 300 are detached to unfix the first attachment portion 121A and the first attachment target portion 200A, and unfix the second attachment portion 122A and the second attachment target portion 201A. Furthermore, the fixing apparatus 10 is taken out from the space between the first side plate 200 and the second side plate 201.

In the state where the fixing apparatus 10 is attached to the apparatus main body 1, the drive input portion 106 and the heater connector 130 disposed at the both ends in the paper width direction of the fixing apparatus 10 are disposed on inner sides of the first side plate 200 and the second side plate 201 of the apparatus main body 1. Consequently, it is possible to cause the fixing apparatus 10 to smoothly transition from the attached state in FIG. 4 to the detached state in FIG. 5. The same applies to reverse transition.

Electrical Connection Configuration of Fixing Apparatus

Figure 6:
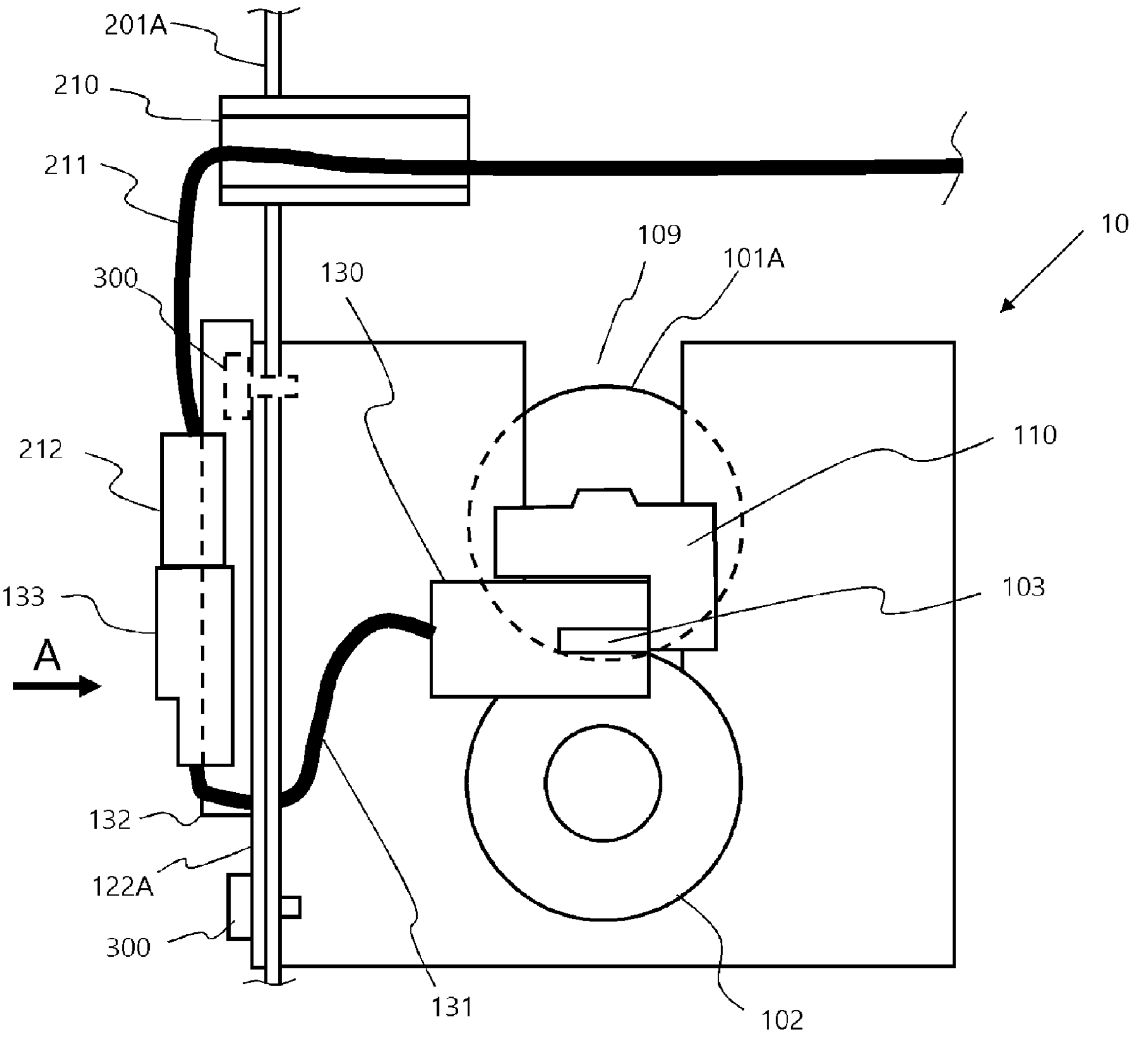
FIG. 6 is a schematic configuration diagram for describing electrical connection of the fixing apparatus according to embodiment 1.
Figure 7:
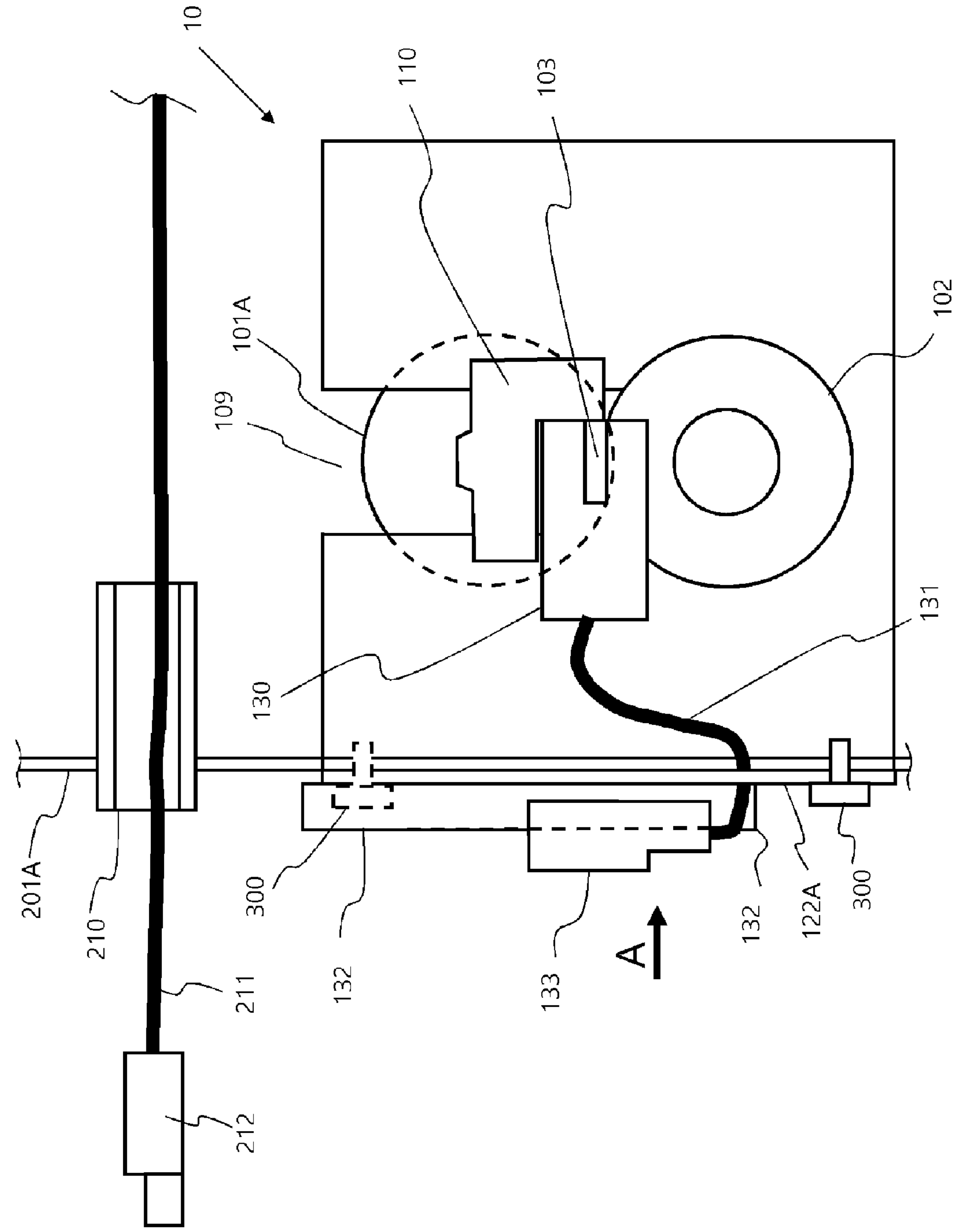
FIG. 7 is a schematic configuration diagram for describing electrical connection of the fixing apparatus according to embodiment 1.
Figure 8:
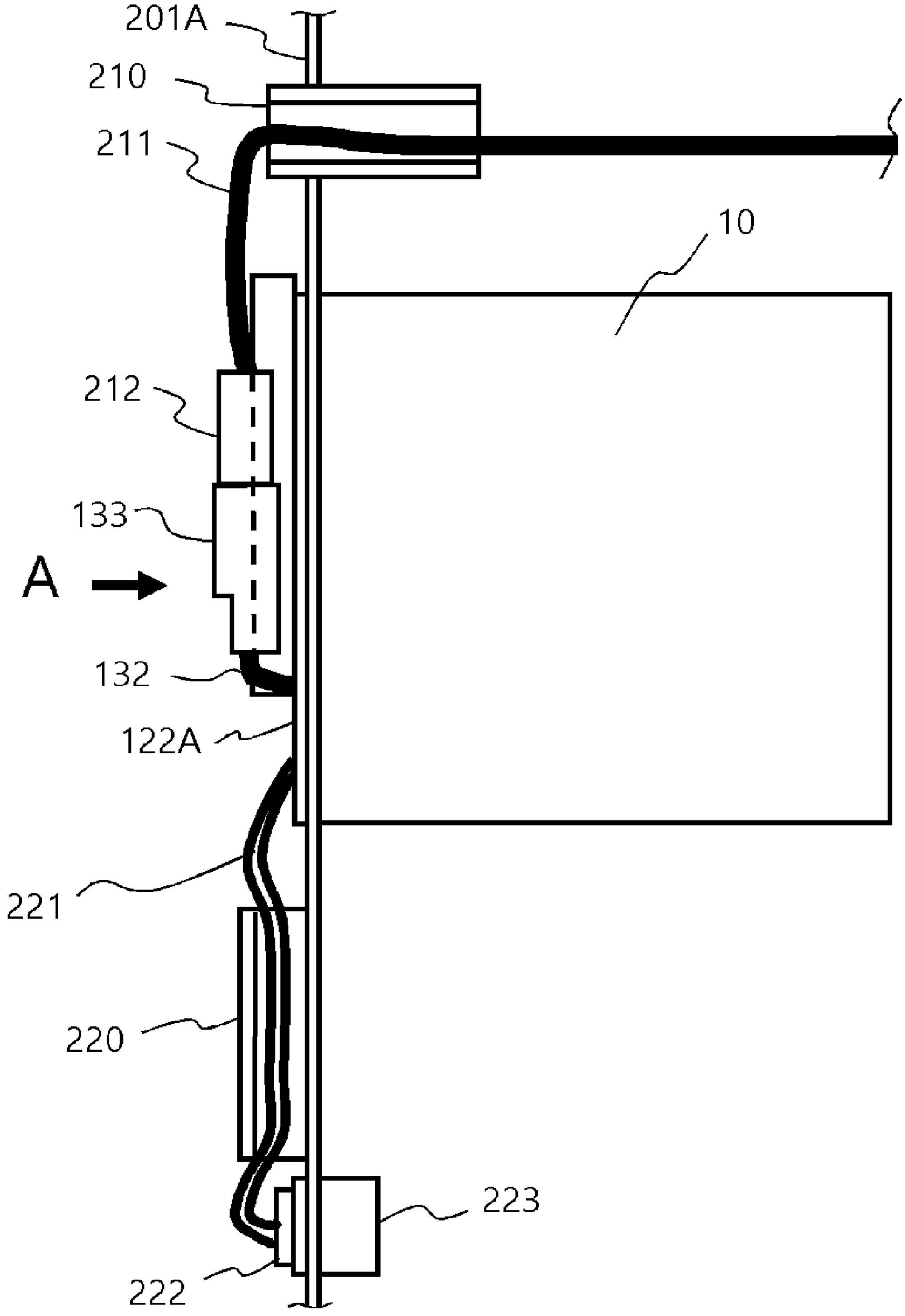
FIG. 8 is a schematic configuration diagram for describing electrical connection of the fixing apparatus according to embodiment 1.

Next, the electrical connection configuration of the fixing apparatus 10 that is a characteristic configuration of the present invention will be described with reference to FIGS. 6 to 8. FIGS. 6 to 8 are schematic views illustrating the vicinity of the fixing apparatus 10 of the apparatus main body 1 in the paper width direction seen from a side at which the heater connector 130 is disposed. FIG. 6 illustrates a state where a first connector 133 and a second connector 212 are connected, and FIG. 7 illustrates a state where the first connector 133 and the second connector 212 are disconnected. FIG. 8 is a schematic view for describing a connection configuration of a cable connected to a sensor or the like in the fixing apparatus 10.

Figure 9:
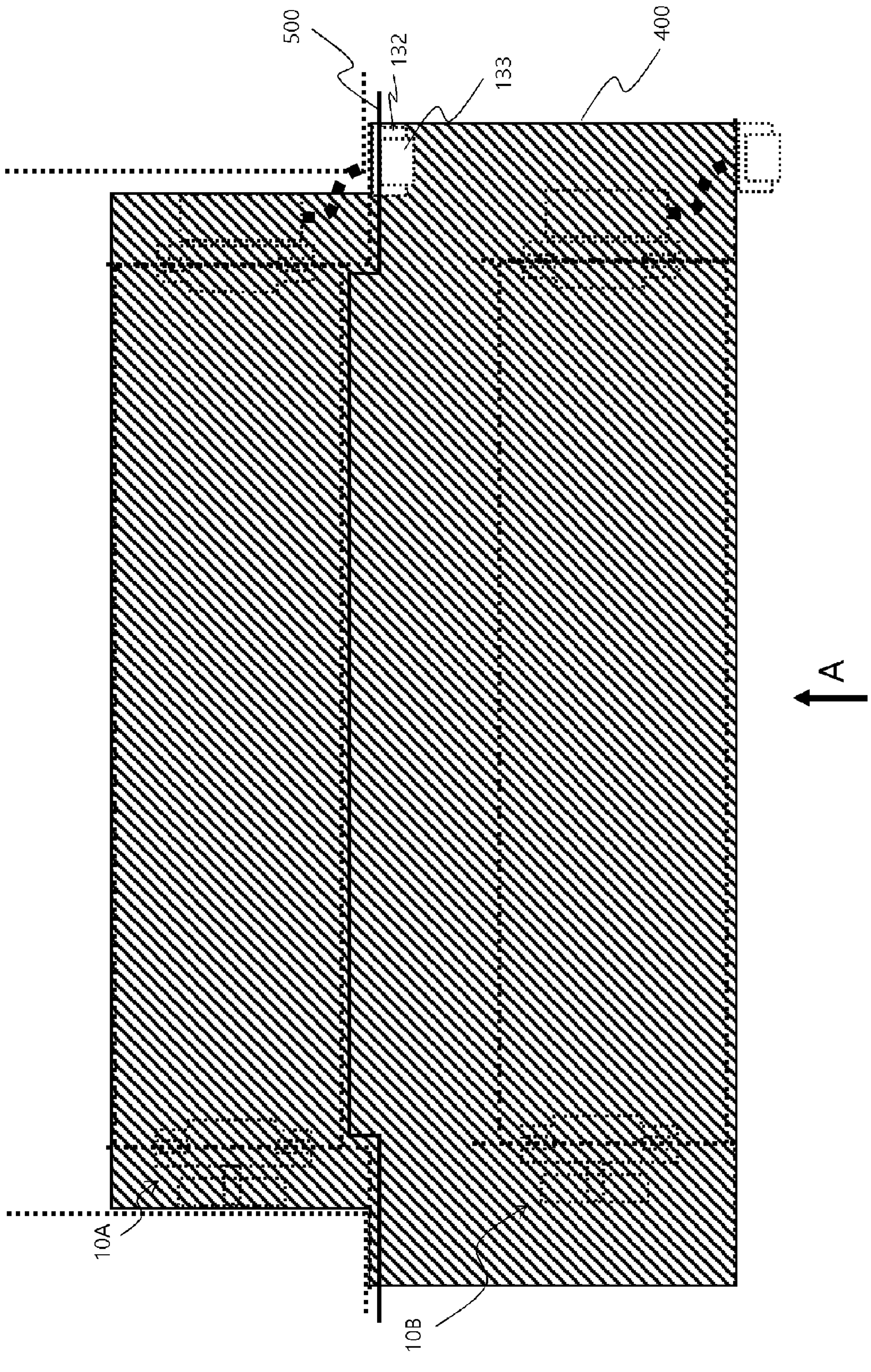
FIG. 9 is a view for describing a position of a connector according to embodiment 1.

As illustrated in FIGS. 5 and 6, a connector holder 132 is attached to a face of the second attachment portion 122A on the outer side of the fixing apparatus 10. The face on the outer side described herein is a face of the second attachment portion 122A at the upstream side in the attaching direction A of the fixing apparatus 10 among the outer wall surfaces (outer wall surfaces of the case 13) of the fixing apparatus 10, and can be a face facing in the attaching direction A and a face facing in the direction opposite to the attaching direction A. Furthermore, this face on the outer side can be the same face as a face that faces an operator in the state where the fixing apparatus 10 is attached to the apparatus main body 1, the operator performing an attaching operation to attach the fixing apparatus 10 to the apparatus main body 1, and a face in contact with a screw thread of the screw 300 among the outer wall surfaces of the fixing apparatus 10 (the outer wall surfaces of the case 13). The first connector 133 is held (fixed) to the connector holder 132 by a claw or the like. That is, the first connector 133 is held (fixed) at the outer side of the fixing apparatus 10 (the upstream side in the attaching direction A). Furthermore, the first connector 133 is fixed into a projected area in a case where an attachment and detachment trajectory of the fixing apparatus 10 is projected along the attaching direction A and on the outer wall surface of the case 13 (the rear wall surface 123, the first attachment portion 121A, and the second attachment portion 122A) that is vertical to the attaching direction A and faces the direction opposite to the attaching direction A. Note that the attachment and detachment trajectory of the fixing apparatus 10 is a passing area or a space through which the fixing apparatus 10 passes when the fixing apparatus 10 is attached to or detached from the apparatus main body 1, and a shaded area 400 in FIG. 9 indicates the range of the attachment and detachment trajectory seen from above. FIG. 9 illustrates a fixing apparatus 10A attached to the apparatus main body 1, and a fixing apparatus 10B detached from the apparatus main body 1 as broken lines. Furthermore, as illustrated in FIG. 9, the first connector 133 is provided on a projected area 500 on which the attachment and detachment trajectory 400 is projected on a wall surface (the rear wall surface 123, the first attachment portion 121A, and the second attachment portion 122A) vertical to the attaching direction A of the fixing apparatus 10.

As illustrated in FIG. 6, a first cable 131 extends from the heater connector 130, and is connected to the first connector 133. The first cable 131 employs a configuration whose one end (first end) is connected to the heater connector 130 that is the fixing member, and whose other end (a second end on a side opposite to the first end) is connected to the first connector 133. The second connector 212 is inserted and connected to the first connector 133 in a direction vertical to the attaching direction A and the paper width direction of the fixing apparatus 10 and from above in FIG. 6.

As illustrated in FIG. 6, a first cable guide 210 that is a guide member that guides a second cable 211 is attached to the second side plate 201. In the apparatus main body 1, the first cable guide 210 is provided right above the attachment and detachment trajectory near the range (attachment and detachment trajectory) that the fixing apparatus 10 passes when the fixing apparatus 10 is attached to or detached from the apparatus main body 1. The first cable guide 210 guides the second cable 211 extending from the second connector 212 so as not to contact and be damaged by an end surface of the second side plate 201 or the like. One end (first end) of the second cable 211 is connected with the second connector 212 that can be attached to or detached from the first connector 133. Another end (a second terminal on a side opposite to the first end) of the second cable 211 is connected to an unillustrated power supply of the apparatus main body 1. The attaching and detaching direction of the first connector 133 and the second connector 212 is parallel to a plane vertical to the attaching direction A.

As illustrated in FIG. 7, the second connector 212 and the second cable 211 are configured to be able to evacuate above the attachment and detachment trajectory of the fixing apparatus 10 in a state where the first connector 133 and the second connector 212 are not connected.

As illustrated in FIG. 8, a plurality of third cables 221 connected to the sensor or the like in the fixing apparatus 10 extend from the fixing apparatus 10. Distal ends of the third cables 221 are connected to at least one or more third connectors 222. The third cables 221 are guided to a second cable guide 220 attached to the second attachment target portion 201A of the second side plate 201. The third connectors 222 are connected to a fourth connector 223 provided to the second attachment target portion 201A of the second side plate 201. The fourth connector 223 is connected to an unillustrated control apparatus that controls the operation of the apparatus main body 1 via an unillustrated cable.

An operation of exchanging the fixing apparatus 10 according to the above-described configuration will be described.

An operation of detaching the fixing apparatus 10 from the apparatus main body 1 will be described first. First, the first connector 133 and the second connector 212 are disconnected. According to embodiment 1, the second connector 212 is detached from the first connector 133 in parallel to the plane vertical to the attaching direction A and upward in FIG. 6. The third connectors 222 and the fourth connector 223 provided to the second attachment target portion 201A of the second side plate 201 are also disconnected, and the third cables 221 are detached from the second cable guide 220. The first connector 133 and the third connector 222 are disposed on the outer side of the fixing apparatus 10 (at the upstream side in the attaching direction A), and are provided to the second attachment portion 122A and the second attachment target portion 201A, respectively, that are the faces facing the operator. Consequently, the first connector 133 and the third connectors 222 provide good visibility, easy access, and good operability.

Next, the screws 300 that fix the fixing apparatus 10 to the first side plate 200 and the second side plate 201 of the apparatus main body 1 are detached. Furthermore, while evacuating the second connector 212 and the second cable 211 to an outside of the attachment and detachment trajectory of the fixing apparatus 10 as illustrated in FIG. 7, the fixing apparatus 10 is detached. At this time, the drive input portion 106 and the heater connector 130 are disposed on the inner sides of the first side plate 200 and the second side plate 201 of the apparatus main body 1, so that it is possible to smoothly detach the fixing apparatus 10.

In this case, the first cable guide 210 is disposed right above the attachment and detachment trajectory of the fixing apparatus 10, so that it is possible to reduce the length of the second cable 211 extending from the first cable guide 210. Consequently, it is possible to make a movable range of the disconnected second connector 212 and second cable 211 smaller, and suppress a probability that the second cable 211 contacts and is damaged by an edge of a sheet metal.

Furthermore, the second connector 212 and the first connector 133 are disposed on a face on the outer side of the second attachment portion 122A. The second connector 212 and the first connector 133 are positioned on the face of the second attachment portion 122A at the upstream side in the attaching direction A, a face facing in the attaching direction A, the face facing in the direction opposite to the attaching direction A, and the face facing the operator who performs the attachment work in the state where the fixing apparatus 10 is attached. Furthermore, the first connector 133 is held in the projected area in the case where the attachment and detachment trajectory of the fixing apparatus 10 is projected along the attaching direction A and on the wall surface (the rear wall surface 123, the first attachment portion 121A, and the second attachment portion 122A) vertical to the attaching direction A of the fixing apparatus 10. Consequently, the space for the connectors is not used between the first side plate 200 and the second side plate 201 of the apparatus main body 1. Furthermore, the connectors are disposed on the attachment and detachment trajectory of the fixing apparatus 10, so that it is possible to prevent the apparatus main body 1 from becoming larger in the paper width direction. Furthermore, an exterior that includes a guide portion that transports the recording material S is disposed on the outer side of the fixing apparatus 10 (at the upstream side in the attaching direction A). By disposing the second connector 212 and the first connector 133 between the second attachment portion 122A and the exterior member in the attaching direction A, it is possible to suppress the size in a paper transport direction of the apparatus main body 1, too.

Next, an operation of attaching the fixing apparatus 10 to the apparatus main body 1 will be described. First, the fixing apparatus 10 is attached to the apparatus main body 1 by being directed to the attaching direction A, and is fixed by the screws 300. In this case, too, the drive input portion 106 and the heater connector 130 are disposed on the inner sides of the first side plate 200 and the second side plate 201 of the apparatus main body 1, so that it is possible to smoothly attach the fixing apparatus 10.

Next, the evacuated second connector 212 is inserted and connected to the first connector 133 in parallel to the plane vertical to the attaching direction A and from above in FIG. 7. In a case of a configuration where the connectors are connected in a direction intersecting the face vertical to the attaching direction A (e.g., a direction parallel to the attaching direction A), a connector arrangement space used on the outer side of the fixing apparatus 10 (at the upstream side in the attaching direction A) or a space used to handle the cables may become larger. In this regard, according to the configuration according to embodiment 1, it is possible to reduce the space for connecting the second connector 212 and the first connector 133 on the outer side of the fixing apparatus 10 (at the upstream side in the attaching direction A), and suppress the apparatus main body 1 from becoming larger. Furthermore, the first connector 133 is fixed to the face of the second attachment portion 122A facing the operator who performs the attachment work in the state where the fixing apparatus 10 is attached, so that operability of connector connecting work is good.

Lastly, after the third cables 221 are inserted in the second cable guide 220, the third connectors 222 are connected to the fourth connector 223 provided to the second side plate 201. In this case, too, the connectors provide good visibility, and can be also easily connected.

Note that, while embodiment 1 has described the example where the fixing apparatus 10 is fixed by the screws 300, there may be employed a configuration where the fixing apparatus 10 is fixed by a locking mechanism not using the screws.

Furthermore, while the example has been described where the drive input portion 106 and the heater connector 130 are disposed on the inner sides of the first side plate 200 and the second side plate 201 of the apparatus main body 1, there may be employed a configuration where the side plates are cut out, and the drive input portion 106 and the heater connector 130 are disposed in the cutout space.

Furthermore, while the example has been described where the attaching and detaching direction of the second connector 212 and the first connector 133 is a direction parallel to the plane vertical to the attaching direction A of the fixing apparatus 10, and the second connector 212 is connected to the first connector 133 from above in FIGS. 6 and 7, there may be employed a configuration where the connector is inserted from below or is inserted from the paper width direction as long as the connector is inserted in the direction parallel to the plane vertical to the attaching direction A.

Furthermore, a holding portion at which, for example, the second connector 212 and the second cable 211 can be hooked and thereby temporarily held when the first connector 133 and the second connector 212 are disconnected may be provided to the first cable guide 210 or the like.

Furthermore, while the example has been described where the second cable guide 220 is attached to the second attachment target portion 201A of the second side plate 201, the second cable guide 220 may be attached to a stay or the like that constitutes a frame of the apparatus main body 1.

Furthermore, while a configuration has been described where the third connectors 222 are connected to the fourth connector 223 provided to the second attachment target portion 201A of the second side plate 201, there may be employed a configuration where a connector is provided to a paper ejecting apparatus disposed above the fixing apparatus 10, and the third connectors 222 are connected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120089, filed on Jul. 28, 2022, which is hereby incorporated by reference herein in its entirety.

What is claimed is:

1. An image forming apparatus comprising:
- an apparatus main body of the image forming apparatus; and
- a fixing unit that fixes onto a sheet-shaped recording medium a toner image formed on a surface of the recording medium, the fixing unit being detachable from the apparatus main body of the image forming apparatus,
- wherein the fixing unit includes:
- a fixing member that fixes the toner image onto the recording medium;
- a case that houses the fixing member, the case including an attachment portion to attach the fixing unit to the apparatus main body;
- a fixing-unit-side cable whose first end is connected to the fixing member; and
- a fixing-unit-side connector that is connected to a second end of the fixing-unit-side cable on a side opposite to the first end of the fixing-unit-side cable,
- wherein the apparatus main body includes:
  - an apparatus-side cable; and
  - an apparatus-side connector connected to the apparatus-side cable,
- wherein the fixing-unit-side connector is connected to the apparatus-side connector,
- wherein the attachment portion is provided on an outer wall surface of the case,
- wherein the outer wall surface of the case faces in a direction opposite to an attaching direction in which the fixing unit is attached to the apparatus main body, and
- wherein the fixing-unit-side connector is provided on the attachment portion.

2. The image forming apparatus according to claim 1, wherein the attachment portion is projected on the outer wall surface of the case that faces in the direction opposite to the attaching direction in which the fixing unit is attached to the apparatus main body.

3. The image forming apparatus according to claim 1,
- wherein an attaching and detaching direction of the fixing-unit-side connector and the apparatus-side connector are parallel to a plane vertical to the attaching direction in which the fixing unit is attached to the apparatus main body.

4. The image forming apparatus according to claim 3, wherein the apparatus main body further comprises a guide member that guides the apparatus-side cable, and that is provided near a passing area through which the fixing unit passes when the fixing unit is attached to or detached from the apparatus main body.

5. The image forming apparatus according to claim 1, wherein the fixing unit is attached to the apparatus main body with a screw at a position of the attachment portion.

* * * * *